(12) United States Patent
Kamimura et al.

(10) Patent No.: US 9,473,696 B2
(45) Date of Patent: Oct. 18, 2016

(54) GAZE DETECTION APPARATUS, GAZE DETECTION COMPUTER PROGRAM, AND DISPLAY APPARATUS

(71) Applicant: FUJITSU LIMITED, Kawasaki-shi, Kanagawa (JP)

(72) Inventors: Takuya Kamimura, Kobe (JP); Hiroyasu Yoshikawa, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 548 days.

(21) Appl. No.: 13/947,605

(22) Filed: Jul. 22, 2013

(65) Prior Publication Data
US 2014/0085451 A1    Mar. 27, 2014

(30) Foreign Application Priority Data
Sep. 24, 2012  (JP) ................ 2012-210182

(51) Int. Cl.
H04N 7/18     (2006.01)
H04N 5/232    (2006.01)

(52) U.S. Cl.
CPC ............... *H04N 5/23219* (2013.01)

(58) Field of Classification Search
None
See application file for complete search history.

(56) References Cited

U.S. PATENT DOCUMENTS

| 5,016,282 A | 5/1991 | Tomono et al. | |
| 5,231,674 A * | 7/1993 | Cleveland | A61B 3/113 351/210 |
| 6,152,563 A * | 11/2000 | Hutchinson | A61B 3/113 351/209 |
| 8,913,004 B1 * | 12/2014 | Bozarth | G06K 9/00604 345/156 |
| 2006/0238707 A1 * | 10/2006 | Elvesjo | G06K 9/00604 351/209 |
| 2008/0292144 A1 * | 11/2008 | Kim | G06K 9/00604 382/117 |
| 2009/0015788 A1 | 1/2009 | Knaan et al. | |
| 2009/0219386 A1 * | 9/2009 | Ebisawa | A61B 3/11 348/78 |
| 2012/0057749 A1 * | 3/2012 | Takahashi | G08G 1/167 382/103 |
| 2012/0147328 A1 * | 6/2012 | Yahav | A61B 3/113 351/210 |
| 2012/0300052 A1 * | 11/2012 | Hanna | G06K 9/00604 348/78 |

FOREIGN PATENT DOCUMENTS

| JP | 2-138673 | 5/1990 |
| JP | 2006-507054 | 3/2006 |
| JP | 2006-095008 | 4/2006 |
| JP | 2012-065719 | 4/2012 |
| JP | 2012-115505 | 6/2012 |

OTHER PUBLICATIONS

JPOA—Office Action of Japanese Patent Application No. 2012-210182 dated May 10, 2016, with English translation.

* cited by examiner

*Primary Examiner* — Frederick Bailey
(74) *Attorney, Agent, or Firm* — Fujitsu Patent Center

(57) ABSTRACT

A gaze detection apparatus includes a light source which illuminates a user's eye, an imaging unit which generates an image by capturing the image of a user's face, and a processor adapted to: estimate a distance between the imaging unit and the user's face; calculate the ratio of the distance between the imaging unit and the user's face to a separation distance between the imaging unit and the light source and determine, based on the ratio, whether a bright pupil phenomenon occurs; detect from the captured image a corneal reflection image of the light source and a center of the user's pupil when determining that the bright pupil phenomenon does not occur; and detect the user's gaze direction or gaze position based on a positional relationship between the center of the user's pupil and the corneal reflection image when determining that the bright pupil phenomenon does not occur.

13 Claims, 10 Drawing Sheets

FIG. 6

| POSITION OF CENTER OF PUPIL | GAZE DIRECTION |
|---|---|
| (0,0) | (0,0) |
| (-1,0) | (-1,0) |
| (-2,0) | (-2,0) |
| ⋮ | ⋮ |

| GAZE DIRECTION (h°,v°) | (0,0) | (0,1) | ⋯ | (2,0) | ⋯ |
|---|---|---|---|---|---|
| GAZE POSITION | (cx,cy) | (cx,cy+40) | ⋯ | (cx+40,cy) | ⋯ |

701  700

GAZE DETECTION APPARATUS, GAZE DETECTION COMPUTER PROGRAM, AND DISPLAY APPARATUS

CROSS-REFERENCE TO RELATED APPLICATION

This application is based upon and claims the benefit of priority of the prior Japanese Patent Application No. 2012-210182, filed on Sep. 24, 2012, the entire contents of which are incorporated herein by reference.

FIELD

The present invention relates to a gaze detection apparatus and gaze detection computer program for detecting a gaze direction by detecting, for example, a Purkinje image, and a display apparatus for use with such a gaze detection apparatus.

BACKGROUND

Work on techniques for detecting the position at which a user is gazing by detecting the direction in which the user is gazing has been proceeding for many years. As one example of such techniques, there is proposed a technique in which an image captured of the user's eye is analyzed to detect the user's pupil and a corneal reflection image of a light source and, based on the displacement between the position of the corneal reflection image and the position of the pupil, the user's gaze is detected (for example, refer to Japanese Laid-open Patent Publication Nos. 2012-65719 and 2012-115505). The corneal reflection image of the light source is referred to as the Purkinje or Purkyne image. In the present application, the corneal reflection image of the light source will be referred to as the Purkinje image.

The technique that uses the Purkinje image for gaze detection requires that the Purkinje image be detected accurately. However, if the separation distance between the light source illuminating the user's eye and the camera used to capture an image of the user's eye is small, the light from the light source is reflected by the user's retina, and the reflected light passed through the user's pupil reaches the camera. It is known that this can result in a bright pupil phenomenon in which the entire pupil appears bright on the image captured by the camera. If this happens, the Purkinje image may become difficult to detect, because the contour of the Purkinje image becomes unclear.

SUMMARY

According to one embodiment, a gaze detection apparatus is provided. The gaze detection apparatus includes a light source which illuminates a user's eye, an imaging unit which generates an image by capturing the image of a user's face, and a processor adapted to: estimate a distance between the imaging unit and the user's face; calculate the ratio of the distance between the imaging unit and the user's face to a separation distance between the imaging unit and the light source and determine, based on the ratio, whether a bright pupil phenomenon in which an entire pupil of the user's eye appears bright due to illumination from the light source occurs; detect from the captured image a corneal reflection image of the light source and a center of the user's pupil when it is determined that the bright pupil phenomenon does not occur; and detect the user's gaze direction or gaze position based on a positional relationship between the center of the user's pupil and the corneal reflection image when it is determined that the bright pupil phenomenon does not occur.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating one example of a mapping table.

FIG. 7 is a diagram illustrating one example of a gaze position table.

DESCRIPTION OF EMBODIMENTS

A gaze detection apparatus according to one embodiment will be described below with reference to drawings.

The present inventor has discovered that, if the ratio of the distance between the user's face and the camera used to capture an image of the user's eye to the separation distance between the camera and the light source illuminating the user's eye is equal to or larger than a predetermined value, a "bright pupil" phenomenon occurs on the image captured by the camera.

In view of this, the gaze detection apparatus estimates the distance between the camera and the user's face at the time of image generation, and obtains the ratio of the distance between the camera and the user's face to the separation distance between the light source and the camera. Then, the gaze detection apparatus detects the user's gaze position based on the image, only when the distance ratio is smaller than the minimum value of the ratio at and above which the bright pupil phenomenon can occur.

In the embodiment hereinafter described, the gaze detection apparatus is incorporated in a computer, and is used to detect the position on a computer display at which the user is gazing. However, the gaze detection apparatus can be applied to various other apparatus, such as portable information terminals, mobile telephones, a car driving assisting apparatus, or car navigation systems, that detect the user's gaze position or gaze direction and that use the detected gaze position or gaze direction.

Figure 1:
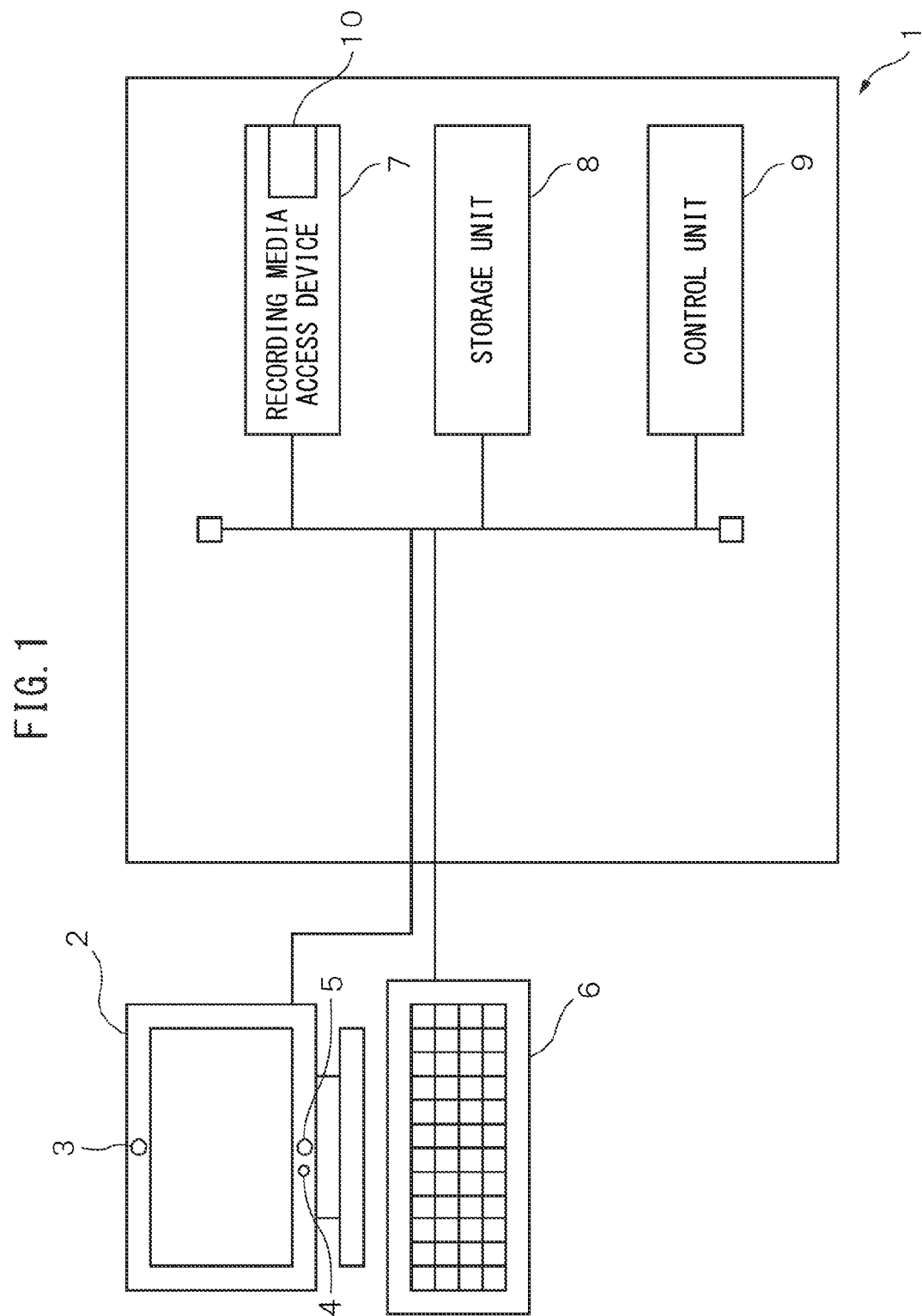
FIG. 1 is a diagram illustrating the hardware configuration of a computer implementing one embodiment of a gaze detection apparatus.

FIG. 1 is a diagram illustrating the hardware configuration of a computer implementing one embodiment of the gaze detection apparatus. The computer 1 includes a display unit 2, a wide-angle camera 3, an illuminating light source 4, an infrared camera 5, an input unit 6, a storage media access device 7, a storage unit 8, and a control unit 9. The computer 1 may further include a communication interface circuit (not depicted) for connecting the computer 1 to other apparatus. The computer 1 may be a so-called desktop computer. In this case, of the various component elements constituting the computer 1, the storage media access device 7, the storage unit 8, and the control unit 9 are contained in a cabinet (not depicted); on the other hand, the display unit 2, the wide-angle camera 3, the illuminating light source 4, the infrared camera 5, and the input unit 6 are provided separately from the cabinet. Alternatively, the computer 1 may be a notebook computer. In this case, all the component elements constituting the computer 1 may be contained in a single cabinet. Further alternatively, the computer 1 may be a computer integrated with a display, in which case all the component elements except the input unit 6 are contained in a single cabinet.

The display unit 2 includes, for example, a liquid crystal display or an organic electroluminescent display. The display unit 2 displays, for example, various icons or operation menus in accordance with control signals from the control unit 9. Each icon or operation menu is associated with information indicating a position or range on the display screen of the display unit 2. As a result, when the user's gaze position detected by the control unit 9 is located at a specific icon or operation menu, it can be determined that the specific icon or operation menu has been selected, as will be described later.

Figure 2:
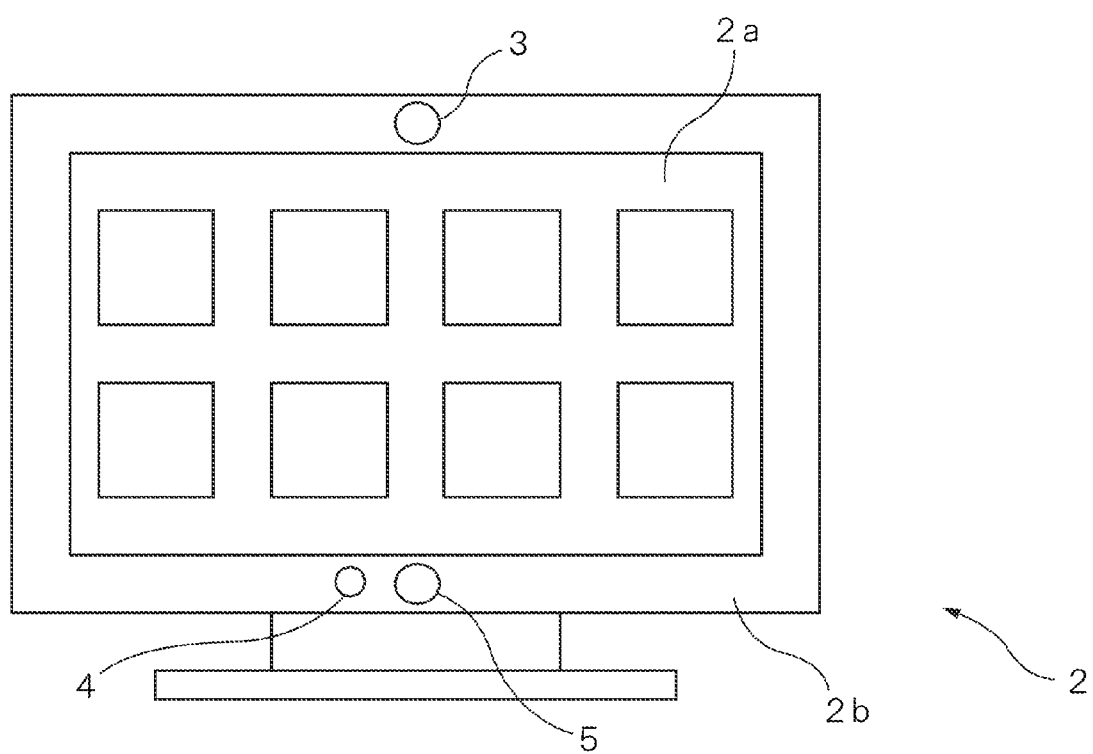
FIG. 2 is a schematic front view of a display unit.

FIG. 2 is a schematic front view of the display unit 2. The display screen 2a for displaying various icons, etc., is provided in the center of the display unit 2, and the display screen 2a is held in position by a surrounding frame 2b. The wide-angle camera 3 is mounted approximately in the center of the frame 2b above the display screen 2a. The illuminating light source 4 and the infrared camera 5 are mounted side by side approximately in the center of the frame 2b below the display screen 2a. In the present embodiment, the wide-angle camera 3 and the infrared camera 5 are mounted by aligning the horizontal position of the wide-angle camera 3 with respect to the horizontal position of the infrared camera 5. It is preferable to mount the wide-angle camera 3 with its optical axis oriented at right angles to the display screen 2a so that the whole face of the user gazing at the display screen 2a will be contained in the captured image. On the other hand, it is preferable to mount the infrared camera 5 with its optical axis oriented either at right angles to the display screen 2a or upward from the normal to the display screen 2a so that the user's eyes and their surrounding portions will be contained in the image captured by the infrared camera 5.

The wide-angle camera 3 is one example of a second imaging unit, has sensitivity to visible light, and has an angle of view (for example, a diagonal angle of view of 60 to 80 degrees) capable of capturing an image of the whole face of the user as long as the face of the user gazing at the display unit 2 of the computer 1 is located within a preassumed range. Then, during the execution of the gaze detection process, the wide-angle camera 3 generates images containing the whole face of the user by shooting, at a predetermined frame rate, the face of the user facing the display screen 2a. Each time the face-containing image is generated, the wide-angle camera 3 passes the image to the control unit 9. Like the infrared camera 5, the wide-angle camera 3 also may be a camera having sensitivity to the infrared light radiated from the illuminating light source 4.

The illuminating light source 4 includes an infrared light emitting source constructed, for example, from at least one infrared emitting diode, and a driving circuit that supplies power from a power supply (not depicted) to the infrared emitting diode in accordance with a control signal received from the control unit 9. The illuminating light source 4 is mounted in the frame 2b side by side with the infrared camera 5 so that the face of the user gazing at the display screen 2a, in particular, the eyes of the user, can be illuminated. The illuminating light source 4 continues to emit the illuminating light during the period when the control signal for lighting the light source is being received from the control unit 9.

The larger the separation distance between the illuminating light source 4 and the infrared camera 5, the less likely the bright pupil phenomenon is to occur. When the separation distance between the illuminating light source 4 and the infrared camera 5 is fixed, the smaller the distance between the infrared camera 5 and the user's face the less likely the bright pupil phenomenon is to occur. On the other hand, since the illumination light emitted from the illuminating light source 4 has a certain degree of directionality, if the separation distance between the illuminating light source 4 and the infrared camera 5 is excessively large, the illumination light illuminating the user's face becomes uneven. As a result, the user's left or right eye, whichever is farthest from the illuminating light source 4, may appear too dark on the image generated by the infrared camera 5, making it difficult to detect the pupil or the Purkinje image. Therefore, it is preferable to determine the separation distance d between the illuminating light source 4 and the infrared camera 5 in accordance, for example, with the following equation.

$$d = l\max/rate \tag{1}$$

where lmax is the distance between the infrared camera 5 and the user's face when the size of the user's pupil and the size of the Purkinje image are both at the lower limit of recognizable size on the image generated by the infrared camera 5. In other words, the narrower the angle of view of the infrared camera 5, or the larger the pixel count, the longer is lmax. On the other hand, rate represents the lower limit value of the ratio of the distance between the infrared camera 5 and the user's face to the separation distance between the illuminating light source 4 and the infrared camera 5, at and above which the bright pupil phenomenon can occur on the captured image.

The infrared camera 5 is one example of an imaging unit, and generates an image containing at least a portion of the user's face including the eyes. For this purpose, the infrared camera 5 includes an image sensor constructed from a two-dimensional array of solid-state imaging devices having sensitivity to the infrared light radiated from the illuminating light source 4, and an imaging optic for focusing an image of the user's eye onto the image sensor. The infrared camera 5 may further include a visible-light cutoff filter between the image sensor and the imaging optic in order to prevent an image reflected by the iris and a Purkinje image of any light other than the illuminating light source 4 from being detected.

The infrared camera 5 has an angle of view (for example, a diagonal angle of view of 30 to 40 degrees) narrower than the angle of view of the wide-angle camera 3. Then, during the execution of the gaze detection process, the infrared camera 5 generates images containing the user's eyes by shooting the user's eyes at a predetermined frame rate. The infrared camera has a resolution high enough that the pupil and the Purkinje image of the light source 4 reflected on the user's cornea can be recognized in the generated image. Each time the eye-containing image is generated, the infrared camera 5 passes the image to the control unit 9.

Since the infrared camera 5 is mounted below the display screen 2a of the display unit 2, as earlier described, the infrared camera 5 shoots the face of the user gazing at the display screen 2a from the position below the display screen 2a. As a result, the computer 1 can reduce the chance of the pupil and the Purkinje image being hidden behind the eyelashes when the user's face is shot by the infrared camera 5.

The sensitivity of the wide-angle camera 3 and the sensitivity of the infrared camera 5 may be optimized independently of each other. For example, the sensitivity of the wide-angle camera 3 may be set relatively low so that the contour of the face can be recognized in the captured image and, on the other hand, the sensitivity of the infrared camera 5 may be set relatively high so that the pupil and the Purkinje image can be recognized in the captured image.

For convenience, the image generated by the wide-angle camera 3 will hereinafter be referred to as the wide-angle image, while the image generated by the infrared camera 5 will be referred to as the narrow-angle image.

The input unit 6 includes, for example, a keyboard and a pointing device such as a mouse. An operation signal entered via the input unit 6 by the user is passed to the control unit 9.

The display unit 2 and the input unit 6 may be combined into one unit, for example, as in the case of a touch panel display. In this case, when the user touches an icon displayed at a specific position on the display screen of the display unit 2, the input unit 6 generates an operation signal associated with the position and supplies the operation signal to the control unit 9.

The storage media access device 7 is a device that accesses a storage medium 10 such as a magnetic disk, a semiconductor memory card, or an optical storage medium. The storage media access device 7 accesses the storage medium 10 to read the gaze detection computer program to be executed on the control unit 9, and passes the program to the control unit 9.

The storage unit 8 includes, for example, a readable/writable nonvolatile semiconductor memory and a readable/writable volatile semiconductor memory. The storage unit 8 stores the gaze detection computer program and various application programs to be executed on the control unit 9 and various kinds of data for the execution of the programs. The storage unit 8 also stores information representing the position and range of each icon currently displayed on the display screen of the display unit 2 or the position and range of any operation menu displayed thereon.

The storage unit 8 further stores various kinds of data to be used for the detection of the user's gaze position. For example, the storage unit 8 stores a mapping table that provides a mapping between the position of the center of the pupil relative to the center of the Purkinje image and the gaze direction of the user. The storage unit 8 may also store a coordinate conversion table for translating position coordinates on the wide-angle image into position coordinates on the narrow-angle image.

The control unit 9 includes one or a plurality of processors and their peripheral circuitry. The control unit 9 is connected to each part of the computer 1 by a signal line, and controls the entire operation of the computer 1. For example, the control unit 9 performs processing appropriate to the operation signal received from the input unit 6 and the application program currently being executed.

Further, the control unit 9 carries out the gaze detection process and determines the position on the display screen 2a of the display unit 2 at which the user is gazing. Then, the control unit 9 matches the user's gaze position against the display region, stored in the storage unit 8, of each specific icon or operation menu displayed on the display screen 2a of the display unit 2. When the user's gaze position is located in the display region of any specific icon or operation menu, the control unit 9 performs processing appropriate to the icon or operation menu. Alternatively, the control unit 9 passes information representing the user's gaze position to the application program currently being executed by the control unit 9. The control unit 9 may instruct the display unit 2 to display an icon indicating the user's gaze position. This enables the user to check the gaze position detected by the computer 1, and if the detected gaze position is displaced from the actual gaze position, the user can move the gaze position detected by the computer 1 to the correct position by shifting his gaze.

Figure 3:
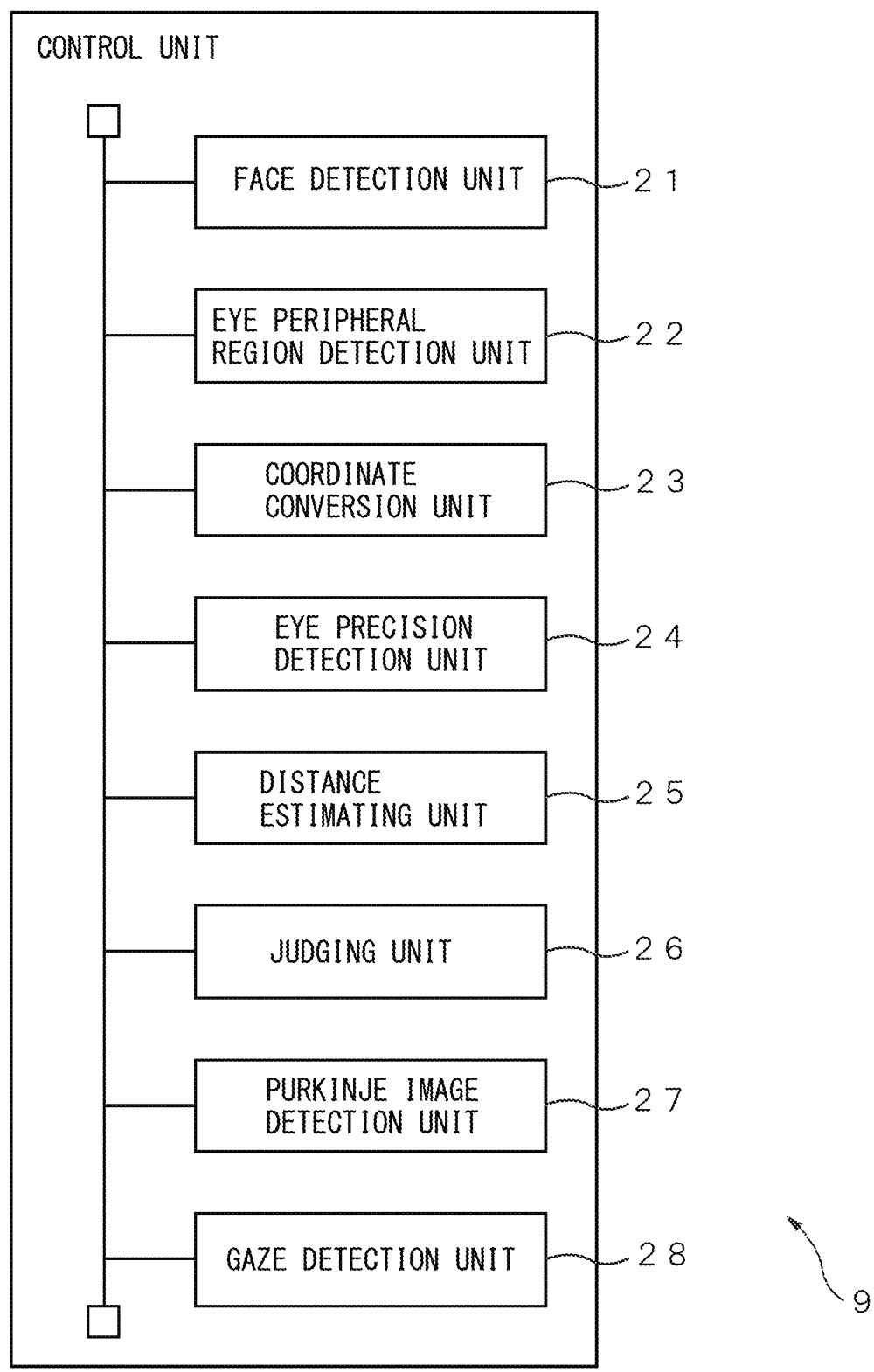
FIG. 3 is a functional block diagram of a control unit for implementing a gaze detection process.

FIG. 3 is a functional block diagram of the control unit 9 for implementing the gaze detection process. The control unit 9 includes a face detection unit 21, an eye peripheral region detection unit 22, a coordinate conversion unit 23, an eye precision detection unit 24, a distance estimating unit 25, a judging unit 26, a Purkinje image detection unit 27, and a gaze detection unit 28. These units constituting the control unit 9 are functional modules implemented by executing a computer program on the processor incorporated in the control unit 9. Alternatively, these units constituting the control unit 9 may be implemented on a single integrated circuit on which the circuits corresponding to the respective units are integrated, and may be mounted in the computer 1 separately from the processor incorporated in the control unit 9. In this case, the integrated circuit may include a storage circuit which functions as a storage unit in the gaze detection apparatus separately from the storage unit 8 and stores various kinds of data used during the execution of the gaze detection process.

The face detection unit 21 detects a face region containing the user's face on the wide-angle image during the execution of the gaze detection process in order to determine the region on the wide-angle image that potentially contains the user's face. For example, the face detection unit 21 converts the value of each pixel in the wide-angle image into a value defined by the HSV color system. Then, the face detection unit 21 extracts any pixel whose hue component (H component) value falls within the range of values corresponding to skin tones (for example, the range of values from 0° to) 30°) as a face region candidate pixel that potentially corresponds to a portion of the face.

Further, when the computer 1 is being operated in response to the user's gaze, it can be assumed that the user's face is positioned so as to face the display screen 2a of the display unit 2 and is located several tens of centimeters away from the display screen 2a. As a result, the region that the user's face occupies on the wide-angle image is relatively large, and the size of the region that the face occupies on the wide-angle image can be estimated to a certain extent.

Therefore, the face detection unit 21 performs labeling on the face region candidate pixels, and extracts a set of neighboring face region candidate pixels as a face candidate region. Then, the face detection unit 21 determines whether the size of the face candidate region falls within a reference range corresponding to the size of the user's face. If the size of the face candidate region falls within the reference range corresponding to the size of the user's face, the face detection unit 21 determines that the face candidate region is the face region. The size of the face candidate region is represented, for example, by the number of pixels taken across the maximum horizontal width of the face candidate region. In this case, the size of the reference range is set, for example, not smaller than one-quarter but not larger than two-thirds of the number of pixels in the horizontal direction of the wide-angle image. Alternatively, the size of the face candidate region may be represented, for example, by the number of pixels contained in the face candidate region. In this case, the size of the reference range is set, for example, not smaller than one-sixteenth but not larger than four-ninths of the total number of pixels contained in the wide-angle image.

The face detection unit 21 may use not only the size of the face candidate region but also the shape of the face candidate region as the criteria for determining whether the face candidate region is the face region or not. Generally, a human face is elliptical in shape. In view of this, if the size of the face candidate region falls within the above reference range, and if the ellipticity of the face candidate region is not less than a given threshold value corresponding to the contour of a typical face, the face detection unit 21 may determine that the face candidate region is the face region. In this case, the face detection unit 21 can compute the ellipticity by obtaining the total number of pixels located on the contour of the face candidate region as the circumferential length of the face candidate region, multiplying the total number of pixels contained in the face candidate region by 4π, and dividing the result by the square of the circumferential length.

Alternatively, the face detection unit 21 may approximate the face candidate region by an ellipse by substituting the coordinates of each pixel on the contour of the face candidate region into an elliptic equation and by applying a least square method. Then, if the ratio of the major axis to the minor axis of the ellipse falls within a range defining the minimum and maximum of the ratio of the major axis to the minor axis of a typical face, the face detection unit 21 may determine that the face candidate region is the face region. When evaluating the shape of the face candidate region by an elliptic approximation, the face detection unit 21 may detect edge pixels corresponding to edges by calculating differences in brightness between adjacent pixels in the image. In this case, the face detection unit 21 connects the edge pixels by using a technique of labeling, and determines that the edge pixels with a connected length longer than a predetermined length represents the contour of the face candidate region.

Alternatively, the face detection unit 21 may detect the face region by using any one of various other methods for detecting the region of the face contained in the image. For example, the face detection unit 21 may perform template matching between the face candidate region and a template corresponding to the shape of a typical face and compute the degree of matching between the face candidate region and the template; then, if the degree of matching is higher than a predetermined value, the face detection unit 21 may determine that the face candidate region is the face region.

When the face region has been detected successfully, the face detection unit 21 generates face region information representing the position and range of the face region. For example, the face region information may be generated as a binary image that has the same size as the wide-angle image and in which the pixel values are different between the pixels contained in the face region and the pixels outside the face region. Alternatively, the face region information may include the coordinates of each corner of the polygon circumscribed about the face region. The face detection unit 21 passes the face region information to the eye peripheral region detection unit 22.

The eye peripheral region detection unit 22 detects an eye peripheral region, i.e., a region containing the user's eyes and their peripheral region, from within the face region defined on the wide-angle image, and uses the eye peripheral region to restrict the range within which to search for a region containing the user's eye on the narrow-angle image and also to estimate the distance between the infrared camera 5 and the user's face.

The brightness of the pixels corresponding to the eye greatly differs from the brightness of the pixels corresponding to the peripheral region of the eye. In view of this, the eye peripheral region detection unit 22 calculates differences between vertically adjacent pixels in the face region by applying, for example, Sobel filtering, and detects edge pixels between which the brightness changes in the vertical direction. Then, the eye peripheral region detection unit 22 detects, for example, a region bounded by two edge lines each formed by connecting a predetermined number of edge pixels corresponding to the size of the eye in a substantially horizontal direction, and takes such a region as an eye peripheral region candidate.

The human eyes are arranged one spaced apart from the other in the horizontal direction. In view of this, the eye peripheral region detection unit 22 extracts, from among the detected eye peripheral region candidates, two eye peripheral region candidates whose centers are the least separated from each other in the vertical direction but are separated from each other in the horizontal direction by a distance corresponding to the distance between the left and right eyes. Then, the eye peripheral region detection unit 22 determines that the region enclosed by the polygon circumscribed about the two eye peripheral region candidates is the eye peripheral region.

Alternatively, the eye peripheral region detection unit 22 may perform template matching between the face region and a template representing the two eyes to detect the region within the face region that best matches the template, and may then determine that the detected region is the eye peripheral region.

The eye peripheral region detection unit 22 passes eye peripheral region information representing the position and range of the eye peripheral region on the wide-angle image to the coordinate conversion unit 23 and the distance estimating unit 25. The eye peripheral region information includes, for example, the coordinates representing the position of each corner of the eye peripheral region on the wide-angle image.

The coordinate conversion unit 23 converts the position coordinates of the eye peripheral region detected on the wide-angle image, for example, the position coordinates of the respective corners of the eye peripheral region, into the position coordinates on the narrow-angle image by considering the angles of view of the wide-angle camera 3 and infrared camera 5 as well as their pixel counts, mounting positions, and shooting directions. In this way, the coordinate conversion unit 23 identifies the region on the narrow-angle image that corresponds to the eye peripheral region. For convenience, the region on the narrow-angle image that corresponds to the eye peripheral region will hereinafter be referred to as the enlarged eye peripheral region.

Figure 4:
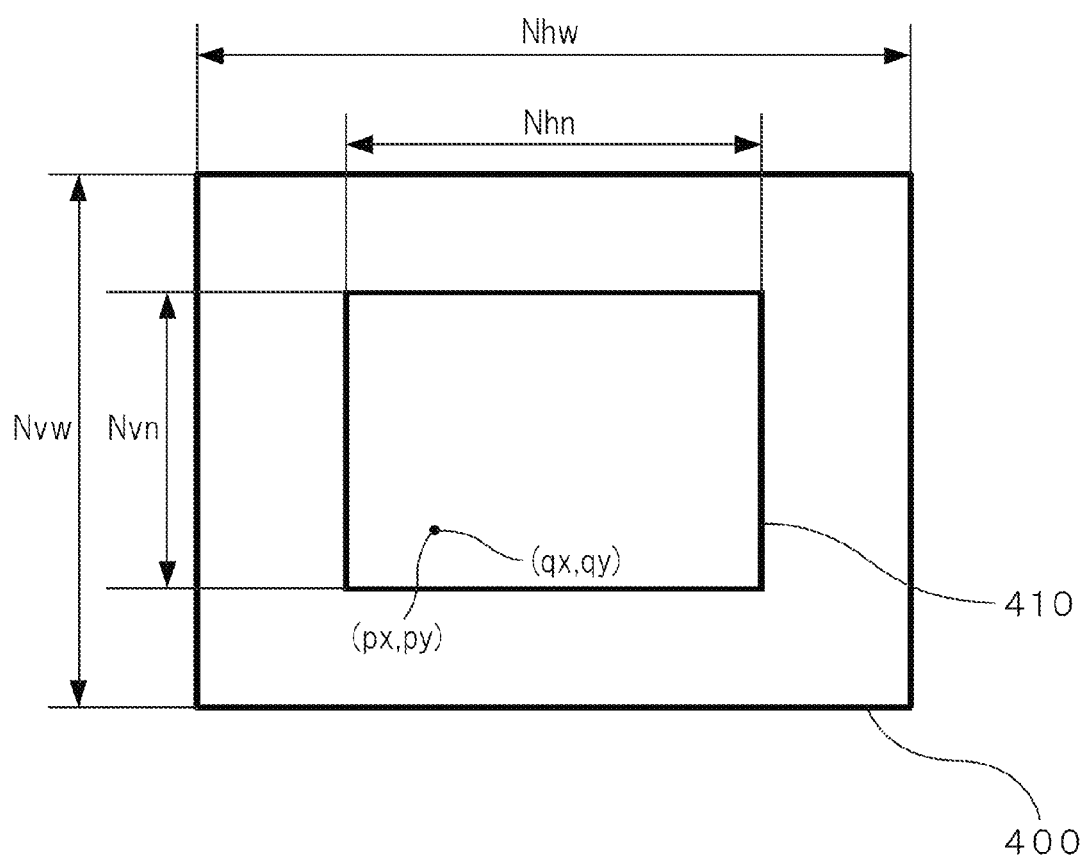
FIG. 4 is a diagram illustrating the relationship of the field of view of a wide-angle camera relative to the field of view of an infrared camera when observed from a position located a prescribed distance away from the display screen of the display unit.

FIG. 4 is a diagram illustrating the relationship of the field of view of the wide-angle camera 3 relative to the field of view of the infrared camera 5 when observed from a position located a prescribed distance away from the display screen 2a of the display unit 2. In the illustrated example, it is assumed that the horizontal position of the wide-angle camera 3 is the same as that of the infrared camera 5, and that the optical axis of the wide-angle camera 3 and the optical axis of the infrared camera 5 cross each other at the position located the prescribed distance away from the display screen 2a. As a result, the center of the field of view 400 of the wide-angle camera 3 coincides with the center of the field of view 410 of the infrared camera 5. Let the horizontal pixel count of the wide-angle camera 3 be denoted by Nhw, and the vertical pixel count of the wide-angle camera 3 by Nvw. On the other hand, the horizontal pixel count of the infrared camera 5 is denoted by Nhn, and the vertical pixel count of the infrared camera 5 by Nvn. Further, the horizontal and vertical angles of view of the wide-angle camera 3 are denoted by ωhw and ωvw, respectively, and the horizontal and vertical angles of view of the infrared camera 5 are denoted by ωhn and ωvn, respectively. Then, the coordinates (qx, qy) of a given pixel in the narrow-angle image, with the origin taken at the center of the narrow-angle image, that correspond to the coordinates (px, py) of the corresponding pixel in the wide-angle image, are expressed by the following equations.

$$qx=(\omega hw/\omega hn)(Nhn/Nhw)px$$

$$qy=(\omega vw/\omega vn)(Nvn/Nvw)py \qquad (2)$$

The coordinate conversion unit 23 can identify the enlarged eye peripheral region by converting the position coordinates of the respective corners of the eye peripheral region on the wide-angle image into the corresponding position coordinates on the narrow-angle image, for example, in accordance with the above equations (2). If the optical axis of the wide-angle camera 3 is displaced from the optical axis of the infrared camera 5 by a given distance at the position of the user's face, the coordinate conversion unit 23 can obtain the coordinates (qx, qy) by just adding an offset corresponding to that given distance to the right-hand sides of the equations (2).

According to one modified example, a coordinate conversion table for translating position coordinates on the wide-angle image into position coordinates on the narrow-angle image may be constructed in advance and may be stored in the storage unit 8. In this case, the coordinate conversion unit 23 can translate the position coordinates of the respective corners of the eye peripheral region on the wide-angle image into the corresponding position coordinates on the narrow-angle image by referring to the coordinate conversion table. According to this modified example, the coordinate conversion unit 23 can accurately identify the enlarged eye peripheral region on the narrow-angle image that corresponds to the eye peripheral region on the wide-angle image, even when the distortion of the wide-angle camera 3 and the distortion of the infrared camera 5 are appreciably large.

According to another modified example, the coordinate conversion unit 23 may perform template matching between the narrow-angle image and a template representing the eye peripheral region on the wide-angle image, and may determine that the region that best matches the template is the enlarged eye peripheral region.

The coordinate conversion unit 23 passes enlarged eye peripheral region information representing the position and range of the enlarged eye peripheral region to the eye precision detection unit 24. The enlarged eye peripheral region information includes, for example, the position coordinates of the respective corners of the enlarged eye peripheral region defined on the narrow-angle image.

The eye precision detection unit 24 receives the enlarged eye peripheral region information from the coordinate conversion unit 23. Then, the eye precision detection unit 24 redetects the eye-containing region from within the region including and surrounding the enlarged eye peripheral region on the narrow-angle image. For convenience, the eye-containing region detected by the eye precision detection unit 24 will hereinafter be referred to as the precision eye region.

Since the size of the user's eye contained in the narrow-angle image is larger than the size of the user's eye contained in the wide-angle image, the eye precision detection unit 24 can use more detailed information on the eye and its surrounding region and can therefore identify the position of the eye more accurately than the eye peripheral region detection unit 22 can.

In a manner similar to that the eye peripheral region detection unit 22 detects the eye peripheral region, the eye precision detection unit 24 performs template matching, for example, between the enlarged eye peripheral region detected on the narrow-angle image and a template corresponding to the two eyes. Then, the eye precision detection unit 24 can detect the region within the enlarged eye peripheral region that best matches the template as the precision eye region.

However, since the field of view of the infrared camera 5 is narrower than the field of view of the wide-angle camera 3, the whole face of the user may not be contained in the narrow-angle image. In this case, if the eye precision detection unit 24 uses the template corresponding to the two eyes, the detection accuracy of the precision eye region may drop because, in the enlarged eye peripheral region, only one eye matches the template. To address this, the eye precision detection unit 24 may change the template to be used, depending on whether the whole of the enlarged eye peripheral region is contained in the narrow-angle image.

For example, when the whole of the enlarged eye peripheral region is contained in the narrow-angle image, the eye precision detection unit 24 uses the template corresponding to the two eyes, for example, in order to detect the precision eye region. On the other hand, when a portion of the enlarged eye peripheral region lies outside the narrow-angle image, the eye precision detection unit 24 may use a template that includes not only the eye contained in the narrow-angle image but also the user's other face parts (such as a nostril, mouth, eyebrow, etc.) than the eye. Further, in this case, since the face parts other than the eye are located away from the eye, such other parts may not be contained in the enlarged eye peripheral region. Therefore, the search range for the precision eye region may be set so as to include not only the enlarged eye peripheral region but also its surrounding region that may potentially contain other parts included in the template. If one or the other of the left and right sides of the enlarged peripheral region lies outside the narrow-angle image, the eye precision detection unit 24 can determine that a portion of the enlarged eye peripheral region lies outside the narrow-angle image.

Further, since the wide-angle camera 3 and the infrared camera 5 are mounted spaced apart from each other in the vertical direction of the display screen 2a, vertical parallax exists between the field of view of the wide-angle camera 3 and the field of view of the infrared camera 5. The parallax varies according to the distance between the display unit 2 and the user's face. In view of this, the eye precision detection unit 24 may not restrict the vertical search range for the precision eye region to the portion between the upper and lower edges of the enlarged eye peripheral region but may only restrict the horizontal search range to the portion between the left and right edges of the enlarged eye peripheral region.

From within the region that best matches the template within the search range defined in the region including and surrounding the enlarged eye peripheral region on the narrow-angle image, the eye precision detection unit 24 detects the portion corresponding to one or the other eye in the template and takes the detected portion as the precision eye region. Then, the eye precision detection unit 24 passes precision eye region information representing the position and range of the precision eye region to the distance estimating unit 25 and the Purkinje image detection unit 27.

Based on the eye peripheral region detected from the wide-angle image and the precision eye region detected from the narrow-angle image, the distance estimating unit 25 estimates the distance between the display unit 2 and the user's face.

Generally, the coordinates of each pixel in an image correspond to the direction pointing from the camera that captured the image to the object that contains that pixel. On the other hand, the distance between the wide-angle camera 3 and the infrared camera 5 and the directions of the optical axes of the respective cameras are known in advance. In view of this, the distance estimating unit 25 obtains, for example, from the position of one or the other eye in the eye peripheral region on the wide-angle image, a direction vector pointing from the wide-angle camera 3 to the eye. Likewise, from the position of the in the precision eye region on the narrow-angle image, the distance estimating unit 25 obtains a direction vector pointing from the infrared camera 5 to the eye. The position of the eye on the wide-angle image and the position of the eye on the narrow-angle image can each be obtained by performing template matching between the eye peripheral region or precision eye region and a template corresponding to the pupil of the eye and by detecting the position that best matches the template.

Based on the distance between the wide-angle camera 3 and the infrared camera 5 and on the direction vectors pointing from the respective cameras to the user's eye, the distance estimating unit 25 obtains the location of a point where the respective direction vectors intersect by using the technique of triangulation. The distance estimating unit 25 estimates the distance between the infrared camera 5 and the user's face by calculating the distance between the infrared camera 5 and the point of intersection.

The distance estimating unit 25 passes the estimated value of the distance between the infrared camera 5 and the user's face to the judging unit 26.

Then, based on the ratio of the estimated distance between the infrared camera 5 and the user's face to the separation distance between the illuminating light source 4 and the infrared camera 5, the judging unit 26 judges whether or not the bright pupil phenomenon occurs on the narrow-angle image. In the present embodiment, the judging unit 26 compares the ratio with a given threshold value. If the ratio is not smaller than the given threshold value, the judging unit 26 determines that it is highly likely that the bright pupil phenomenon has occurred on the narrow-angle image, and aborts the gaze position detection being performed using the narrow-angle image. Then, the judging unit 26 instructs the display unit 2 to display an alarm message to notify the user that the user's face is located too far away from the display unit 2.

On the other hand, if the ratio is smaller than the given threshold value, it is highly likely that the narrow-angle image is in a dark pupil condition in which the pupil, except the Purkinje image, is dark. Therefore, the judging unit 26 instructs the Purkinje image detection unit 27 to detect the Purkinje image and the pupil.

Figure 5:
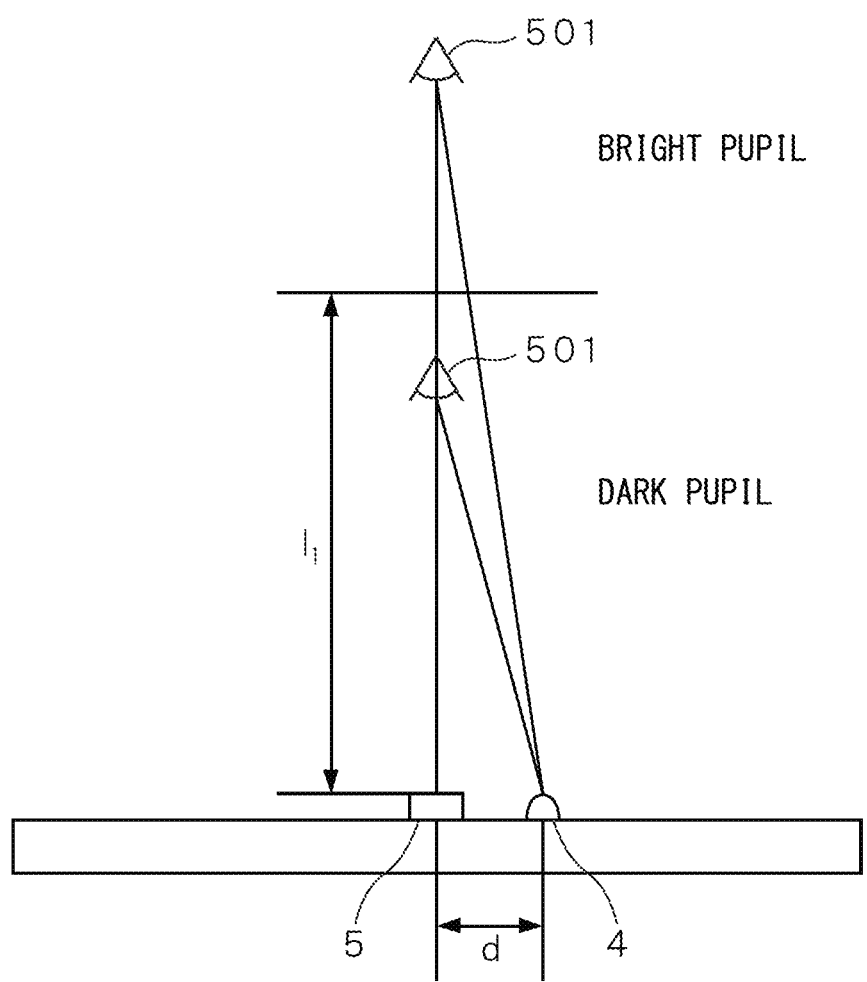
FIG. 5 is a diagram illustrating one example of the positional relationship of the user's face relative to an illuminating light source and the infrared camera.

FIG. 5 is a diagram illustrating one example of the positional relationship of the user's face relative to the illuminating light source 4 and the infrared camera 5. The larger the ratio of the distance between the infrared camera 5 and the user's face to the separation distance d between the illuminating light source 4 and the infrared camera 5, i.e., the smaller the angle that the line joining the pupil to the infrared camera 5 makes with the line joining the pupil to the illuminating light source 4, the more likely the bright pupil phenomenon will occur. For example, when the user's eye 501 is located within a distance 11 from the infrared camera 5, the bright pupil phenomenon does not occur, but when the user's eye 501 is located at a distance farther than the distance 11 from the infrared camera 5, the bright pupil phenomenon occurs. Therefore, the given threshold value is set, for example, equal to the lower limit value of the ratio of the distance between the infrared camera 5 and the user's face to the separation distance between the illuminating light source 4 and the infrared camera 5, at and above which the bright pupil phenomenon can occur.

The present inventor obtained, through experiment, the ratio of the distance between the infrared camera 5 and the user's face to the separation distance d between the illuminating light source 4 and the infrared camera 5 when the bright pupil phenomenon occurred for a plurality of subjects. When the user was at work using a personal computer equipped with a 15- to 24-inch diagonal display monitor, the average distance between the infrared camera 5 and the user's face was 500 mm. In this case, the bright pupil phenomenon occurred when the separation distance d between the illuminating light source 4 and the infrared camera 5 was 15 mm or smaller (the ratio of the distance between the infrared camera 5 and the user's face to the separation distance d was 26.7). After performing the experiment by varying the separation distance d or varying the distance between the infrared camera 5 and the user's face, and considering differences between different individuals, the present inventor discovered that the lower limit value of the ratio at and above which the bright pupil phenomenon occurred was about 26 to 27. Therefore, in the present embodiment, the threshold value has been set to 27.

Preferably, the illuminating light source 4 and the infrared camera 5 are separated by a minimum distance determined by dividing the maximum expected distance between the display unit 2 and the user by a prescribed coefficient, for example, the above threshold value. It is also preferable to sufficiently satisfy this threshold condition thereby avoiding the bright pupil phenomenon, while at the same time, suppressing the brightness unevenness in the illumination light illuminating the user's face. For example, let "lmax" represent the distance between the infrared camera 5 and the user's face when the size of the user's pupil and the size of the Purkinje image are both at the lower limit of recognizable size on the image generated by the infrared camera 5, and "rate" the threshold value of 27; then, according to the earlier given equation (1), the separation distance d is set to about 50.0 mm. With this arrangement, as long as the gaze detection process can be performed using the Purkinje image, the bright pupil phenomenon does not occur, and at the same time, the uneven illumination of the user's face by the illuminating light source 4 can be suppressed.

During the execution of the gaze detection process, the Purkinje image detection unit 27 detects the pupil and the Purkinje image from within the precision eye region defined on the narrow-angle image. In the present embodiment, the Purkinje image detection unit 27 performs template matching between the precision eye region and a template corresponding to the pupil of one eye, and detects from within the precision eye region the region that best matches the template. Then, when the maximum value of the degree of matching is higher than a predetermined degree-of-matching threshold value, the Purkinje image detection unit 27 determines that the pupil is contained in the detected region. A plurality of templates may be prepared according to the size of the pupil. In this case, the Purkinje image detection unit 27 matches the precision eye region against the plurality of templates, and obtains the maximum value of the degree of matching. If the maximum value of the degree of matching is higher than the degree-of-matching threshold value, the Purkinje image detection unit 27 determines that the pupil is contained in the region that matches the template that yielded the maximum value of the degree of matching. The degree of matching is calculated, for example, as the value of normalized cross-correlation between the template and the region that matches the template. The degree-of-matching threshold value is set, for example, to 0.7 or 0.8.

The brightness of the region containing the pupil is lower than the brightness of its surrounding region, and the pupil is substantially circular in shape. In view of this, the Purkinje image detection unit 27 sets two concentric rings with differing radii within the precision eye region. Then, if the difference between the average brightness value of the pixels corresponding to the outer ring and the average brightness value of the inner pixels is larger than a predetermined threshold value, the Purkinje image detection unit 27 may determine that the region enclosed by the inner ring represents the pupil region. The Purkinje image detection unit 27 may detect the pupil region by further detecting whether the average brightness value of the region enclosed by the inner ring is not larger than a predetermined threshold value. In this case, the predetermined threshold value is set equal to a value obtained by adding 10 to 20% of the difference between the maximum and minimum brightness values of the precision eye region to the minimum brightness value.

When the pupil region has been detected successfully, the Purkinje image detection unit 27 calculates the position coordinates of the center of the pupil region by calculating the average values of the horizontal coordinate values and vertical coordinate values of the pixels contained in the pupil region. On the other hand, if the detection of the pupil region has failed, the Purkinje image detection unit 27 returns a signal representing the detection result to the control unit 9.

Further, the Purkinje image detection unit 27 detects the Purkinje image of the illuminating light source 4 from within the precision eye region. The brightness of the region containing the Purkinje image of the illuminating light source 4 is higher than the brightness of its surrounding region, and the brightness value is substantially saturated (that is, the brightness value is substantially equal to the highest brightness value that the pixel value can take). Further, the shape of the region containing the Purkinje image of the illuminating light source 4 is substantially identical with the shape of the light-emitting face of the light source. In view of this, the Purkinje image detection unit 27 sets, within the precision eye region, two rings having a common center but differing in size and having a shape that substantially matches the contour shape of the light-emitting face of the illuminating light source 4. Then, the Purkinje image detection unit 27 obtains a difference value by subtracting the average brightness value of the outer pixels from the inner average brightness value representing the average brightness value of the pixels corresponding to the inner ring. Then, if the difference value is larger than a predetermined difference threshold value, and if the inner average brightness value is higher than a predetermined brightness threshold value, the Purkinje image detection unit 27 determines that the region enclosed by the inner ring represents the Purkinje image of the illuminating light source 4. The difference threshold value may be determined, for example, by taking the average value of the difference values calculated between adjacent pixels in the precision eye region. On the other hand, the predetermined brightness threshold value may be set, for example, to 80% of the highest brightness value in the precision eye region.

The Purkinje image detection unit 27 may detect the region containing the pupil by using any one of various other methods for detecting the region containing the pupil on the image. Likewise, the Purkinje image detection unit 27 may detect the region containing the Purkinje image of the illuminating light source 4 by using any one of various other methods for detecting the region containing the Purkinje image of the light source on the image.

When the Purkinje image of the illuminating light source 4 has been detected successfully, the Purkinje image detection unit 27 calculates the position coordinates of the center of the Purkinje image by calculating the average values of the horizontal coordinate values and vertical coordinate values of the pixels contained in the Purkinje image. On the other hand, if the detection of the Purkinje image of the illuminating light source 4 has failed, the Purkinje image detection unit 27 returns a signal representing the detection result to the control unit 9. The Purkinje image detection unit 27 passes information indicating the center of the Purkinje image and the center of the pupil to the gaze detection unit 28.

During the execution of the gaze detection process, the gaze detection unit 28 detects the user's gaze direction or gaze position based on the center of the Purkinje image and the center of the pupil.

Since the surface of the cornea is substantially spherical in shape, the position of the Purkinje image of the light source remains substantially unchanged and unaffected by the gaze direction. On the other hand, the center of the pupil moves as the gaze direction moves. Therefore, the gaze detection unit 28 can detect the user's gaze direction by obtaining the position of the center of the pupil relative to the center of the Purkinje image.

In the present embodiment, the gaze detection unit 28 obtains the position of the center of the pupil relative to the center of the Purkinje image of the light source, for example, by subtracting the horizontal and vertical coordinates of the center of the Purkinje image from the horizontal and vertical coordinates of the center of the pupil. Then, the gaze detection unit 28 determines the user's gaze direction by referring to a mapping table that provides a mapping between the relative position of the center of the pupil and the user's gaze direction.

FIG. 6 is a diagram illustrating one example of the mapping table. Each entry in the left-hand column of the mapping table 600 carries the coordinates of the position of the center of the pupil relative to the center of the Purkinje image of the light source. Each entry in the right-hand column of the mapping table 600 carries the user's gaze direction corresponding to the coordinates of the relative position of the center of the pupil carried in the left-hand entry. In the illustrated example, the gaze direction is expressed in terms of the horizontal and vertical angular differences relative to the reference gaze direction which is, in this case, the gaze direction when the user is gazing at a designated reference point (for example, the center of the display screen 2a or the mounting position of the infrared camera 5). The coordinates of the relative position of the center of the pupil are expressed in units of pixels on the image.

Further, the gaze detection unit 28 detects, based on the user's gaze direction, the position at which the user is gazing on the display screen 2a of the display unit 2. For convenience, the position on the display screen 2a at which the user is gazing will hereinafter be referred to simply as the gaze position. In the present embodiment, the gaze detection unit 28 determines the user's gaze position by referring to a gaze position table that provides a mapping between the user's gaze direction and the user's gaze position on the display screen.

FIG. 7 is a diagram illustrating one example of the gaze position table. The top row in the gaze position table 700 carries the user's gaze direction. Each entry in the gaze position table 700 carries the coordinates of the corresponding gaze position on the display screen 2a in units of pixels. For example, entry 701 in the gaze position table 700 indicates that the gaze position is (cx, cy+40) when the gaze direction is 0° in the horizontal direction and 1° in the vertical direction. In the illustrated example, cx and cy are the coordinates of the gaze position when the gaze direction is (0, 0), i.e., the coordinates of the reference gaze position, for example, the horizontal and vertical coordinates of the center of the display screen 2a.

The gaze detection unit 28 can use the estimated distance between the infrared camera 5 and the user's face in order to obtain the user's gaze position on the display screen 2a with higher accuracy. For example, a gaze position table that provides a mapping between the gaze direction and the gaze position for each distance between the infrared camera 5 and the user's face may be stored in advance in the storage unit 8. In this case, the gaze detection unit 28 determines the gaze position by referring to the gaze position table read out of the storage unit 8 for the estimated distance between the infrared camera 5 and the user's face.

On the other hand, when only the gaze position table for a preassumed distance between the infrared camera 5 and the user's face (hereinafter referred to as the reference distance) is stored in the storage unit 8, the gaze detection unit 28 obtains the ratio of the estimated distance between the display unit 2 and the user's face to the reference distance. Then, the gaze detection unit 28 may correct the gaze position by calculating the difference between the coordinates of the gaze position corresponding to the gaze direction obtained by referring to the gaze position table and the coordinates of the reference gaze position, and by moving the position away from the reference gaze position toward the gaze position by a distance obtained by multiplying the difference by the ratio.

The gaze detection unit 28 passes information indicating the user's gaze position to the application program being executed by the control unit 9.

Figure 8:
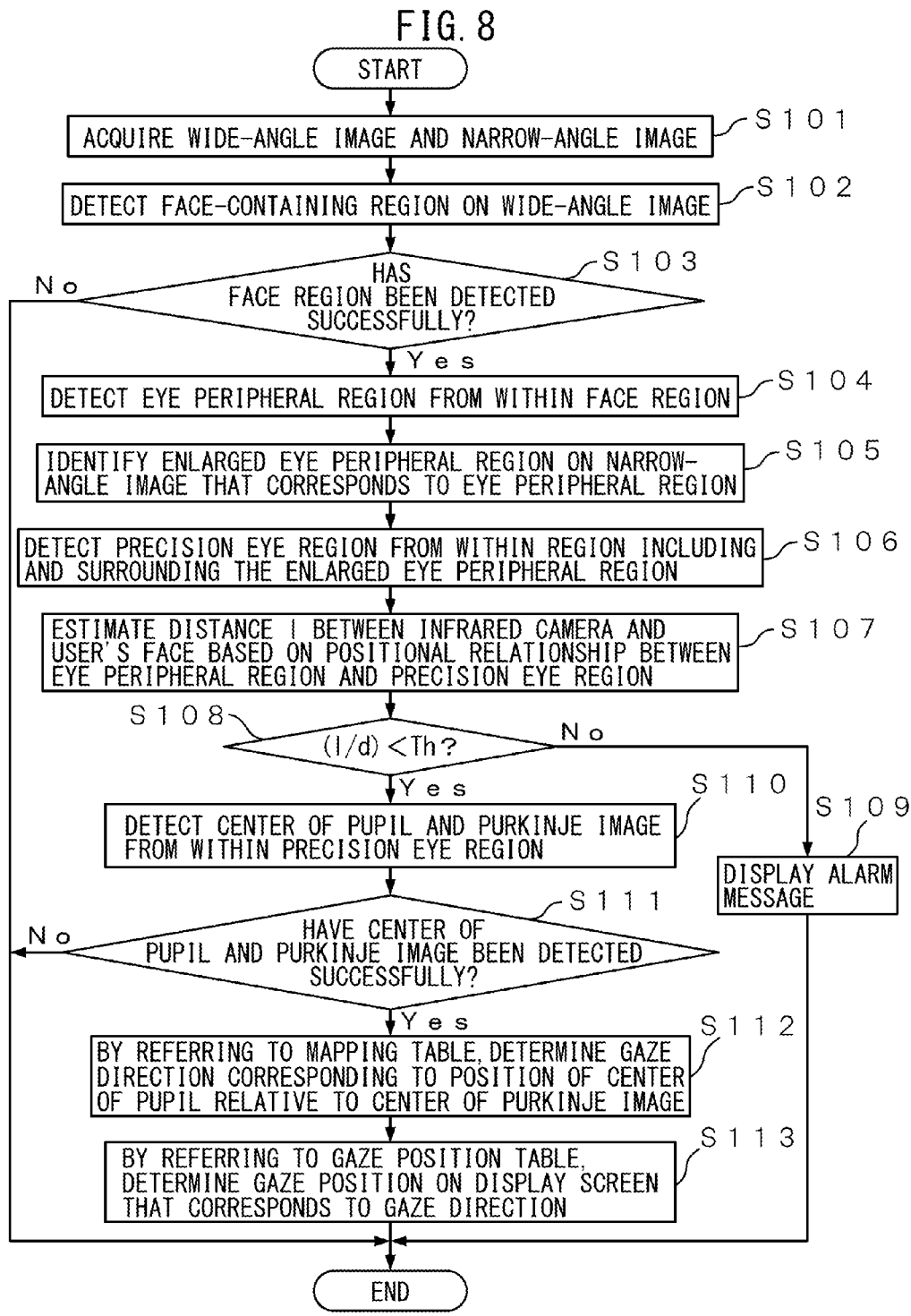
FIG. 8 is a diagram illustrating an operation flowchart of the gaze detection process.

FIG. 8 illustrates an operation flowchart of the gaze detection process carried out by the control unit 9. The control unit 9 carries out the gaze detection process in accordance with the following operation flowchart each time the wide-angle image and narrow-angle image are generated.

The control unit 9 acquires the wide-angle image from the wide-angle camera 3 and acquires the narrow-angle image generated by the infrared camera 5 by capturing an image of the user's face with the illuminating light source 4 turned on (step S101). The face detection unit 21 in the control unit 9 detects the face region containing the face on the wide-angle image (step S102). The face detection unit 21 determines whether the face region has been detected successfully or not (step S103). If the detection of the face region has failed (No in step S103), it is presumed that the user is not looking at the display screen 2a of the display unit 2. Therefore, the control unit 9 terminates the gaze detection process.

On the other hand, when the face region has been detected successfully (Yes in step S103), the face detection unit 21 passes the face region information to the eye peripheral region detection unit 22 in the control unit 9. The eye peripheral region detection unit 22 detects the eye peripheral region from within the face region detected on the wide-angle image (step S104). Then, the eye peripheral region detection unit 22 passes the eye peripheral region information to the coordinate conversion unit 23 and the distance estimating unit 25 in the control unit 9.

The coordinate conversion unit 23 identifies the enlarged eye peripheral region on the narrow-angle image that corresponds to the eye peripheral region detected on the wide-angle image (step S105). Then, the coordinate conversion unit 23 passes the enlarged eye peripheral region information to the eye precision detection unit 24 in the control unit 9.

The eye precision detection unit 24 that received the enlarged eye peripheral region information from the coordinate conversion unit 23 detects the precision eye region from within the region including and surrounding the enlarged eye peripheral region (step S106). Then, the eye precision detection unit 24 passes the precision eye region information to the distance estimating unit 25 and the Purkinje image detection unit 27.

Based on the positional relationship between the eye located within the eye peripheral region and the eye located within the precision eye region, the distance estimating unit 25 estimates the distance 1 between the infrared camera 5 and the user's face, for example, by triangulation (step S107). The distance estimating unit 25 passes the distance 1 to the judging unit 26 in the control unit 9.

The judging unit 26 judges whether or not the ratio of the distance 1 to the separation distance d between the illuminating light source 4 and the infrared camera 5, i.e., (l/d), is smaller than a given threshold value Th (step S108). The given threshold value Th is set, for example, equal to the lower limit value of (l/d) at and above which the bright pupil phenomenon can occur, as earlier described.

If the ratio (l/d) is not smaller than the threshold value Th (No in step S108), the judging unit 26 instructs the display unit 2 to display an alarm message to notify the user that the user's face is located too far away from the display unit (step S109). After that, the control unit 9 terminates the gaze detection process.

On the other hand, if the ratio (l/d) is smaller than the threshold value Th (Yes in step S108), the Purkinje image detection unit 27 detects the center of the pupil and the Purkinje image from within the precision eye region defined on the narrow-angle image (step S110). Then, the Purkinje image detection unit 27 determines whether the center of the pupil and the Purkinje image have been detected successfully (step S111).

If the Purkinje image detection unit 27 has failed to detect the center of the pupil or the Purkinje image of the illuminating light source 4 (No in step S111), the control unit 9 terminates the gaze detection process. After that, the control unit 9 may transmit control signals indicating new exposure conditions to the wide-angle camera 3 and the infrared camera 5 so that the user's face may be shot under the new exposure conditions different from the exposure conditions used for the previous shooting. On the other hand, if the Purkinje image detection unit 27 has successfully detected the center of the pupil and the Purkinje image of the illuminating light source 4 (Yes in step S111), the Purkinje image detection unit 27 passes information indicating the center of the Purkinje image and the center of the pupil to the gaze detection unit 28.

The gaze detection unit 28 detects, by referring to the mapping table, the gaze direction corresponding to the position of the center of the pupil relative to the center of the Purkinje image (step S112).

The gaze detection unit 28 obtains, by referring to the gaze position table, the gaze position on the display screen 2a of the display unit 2 that corresponds to the gaze direction (step S113). Then, the gaze detection unit 28 passes information representing the gaze position to the application program being executed by the control unit 9. After that, the control unit 9 terminates the gaze detection process.

As has been described above, the gaze detection apparatus according to the first embodiment estimates the distance between the infrared camera and the user's face and, based on the ratio of the estimated distance to the separation distance between the illuminating light source and the infrared camera, determines whether the bright pupil phenomenon occurs or not. Then, when the ratio is large enough that the bright pupil phenomenon occurs, the gaze detection apparatus does not detect the gaze position but issues an alarm to the effect that the user's face is located too far away from the display unit. The gaze detection apparatus can prevent erroneous detection of the user's gaze position when the bright pupil phenomenon occurs.

Next, a gaze detection apparatus according to a second embodiment will be described. The gaze detection apparatus according to the second embodiment includes two illuminating light sources disposed at different distances from the infrared camera, and usually illuminates the user's face by using the illuminating light source mounted nearer to the infrared camera. Then, when the ratio of the estimated distance between the infrared camera and the user's face to the separation distance between the infrared camera and the illuminating light source nearer to it is large enough that the bright pupil phenomenon can occur, the gaze detection apparatus switches the light source for illuminating the user's face to the illuminating light source mounted farther from the infrared camera.

The gaze detection apparatus according to the second embodiment differs from the gaze detection apparatus according to the first embodiment in the processing performed by the judging unit in the control unit in relation to the two illuminating light sources. The following description therefore deals with the illuminating light sources and the judging unit. For the other units constituting the gaze detection apparatus, refer to the related description in the first embodiment.

Figure 9:
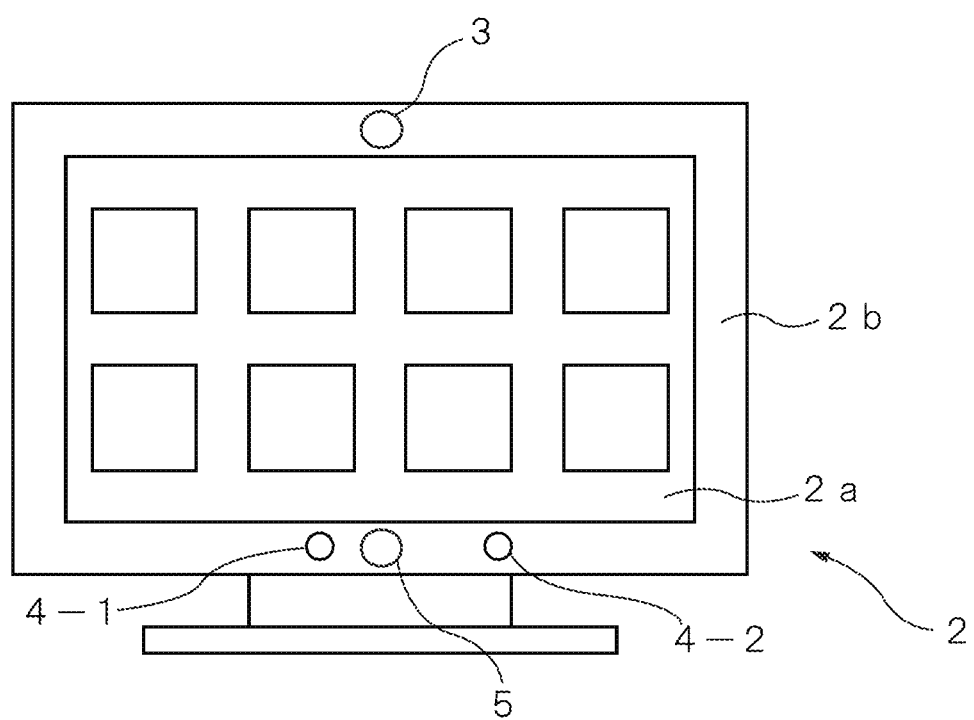
FIG. 9 is a schematic front view of a display unit according to a second embodiment.

FIG. 9 is a schematic front view of the display unit 2 according to the second embodiment. The wide-angle camera 3 is mounted approximately in the center of the frame 2b above the display screen 2a located in the center of the display unit 2. The two illuminating light sources 4-1 and 4-2 and the infrared camera 5 are mounted side by side approximately in the center of the frame 2b below the display screen 2a.

The illuminating light source 4-1 is mounted nearer to the infrared camera 5 than the illuminating light source 4-2 is; for example, the distance between the illuminating light source 4-1 and the infrared camera 5 is 30 mm, and the distance between the illuminating light source 4-2 and the infrared camera 5 is 60 mm. The distance between the infrared camera 5 and the illuminating light source 4-2 may be determined in accordance with the earlier given equation (1).

When the ratio of the distance 1 between the infrared camera 5 and the user's face to the separation distance $d_{near}$ between the illuminating light source 4-1 and the infrared camera 5, i.e., ($l/d_{near}$), is smaller than a threshold value Th, the judging unit 26 causes the illuminating light source 4-1 to illuminate the user's face. On the other hand, when the ratio ($l/d_{near}$) is not smaller than the threshold value Th, the judging unit 26 causes the illuminating light source 4-2 to illuminate the user's face. The threshold value Th is set equal to the lower limit value of that ratio at and above which the bright pupil phenomenon can occur, for example, just like the threshold value for the ratio, (l/d), of the distance 1 between the infrared camera 5 and the user's face to the separation distance d between the illuminating light source 4 and the infrared camera 5 in the first embodiment. With this arrangement, when the distance between the user's face and the infrared camera 5 is short enough that the bright pupil phenomenon does not occur even if the illuminating light source 4-1 is turned on, the illuminating light source 4-1 is used to illuminate the user's face, and thus the unevenness in the illumination of the user's face can be reduced. This serves to prevent the detection accuracy of the pupil and the Purkinje image from degrading. On the other hand, when the user's face is located so far away from the infrared camera 5 that the bright pupil phenomenon could occur if the illuminating light source 4-1 were turned on, the illuminating light source 4-2 located farther from the infrared camera 5 than the illuminating light source 4-1 is turned on to illuminate the user's face; in this way, the gaze detection apparatus can suppress the occurrence of the bright pupil phenomenon.

Figure 10:
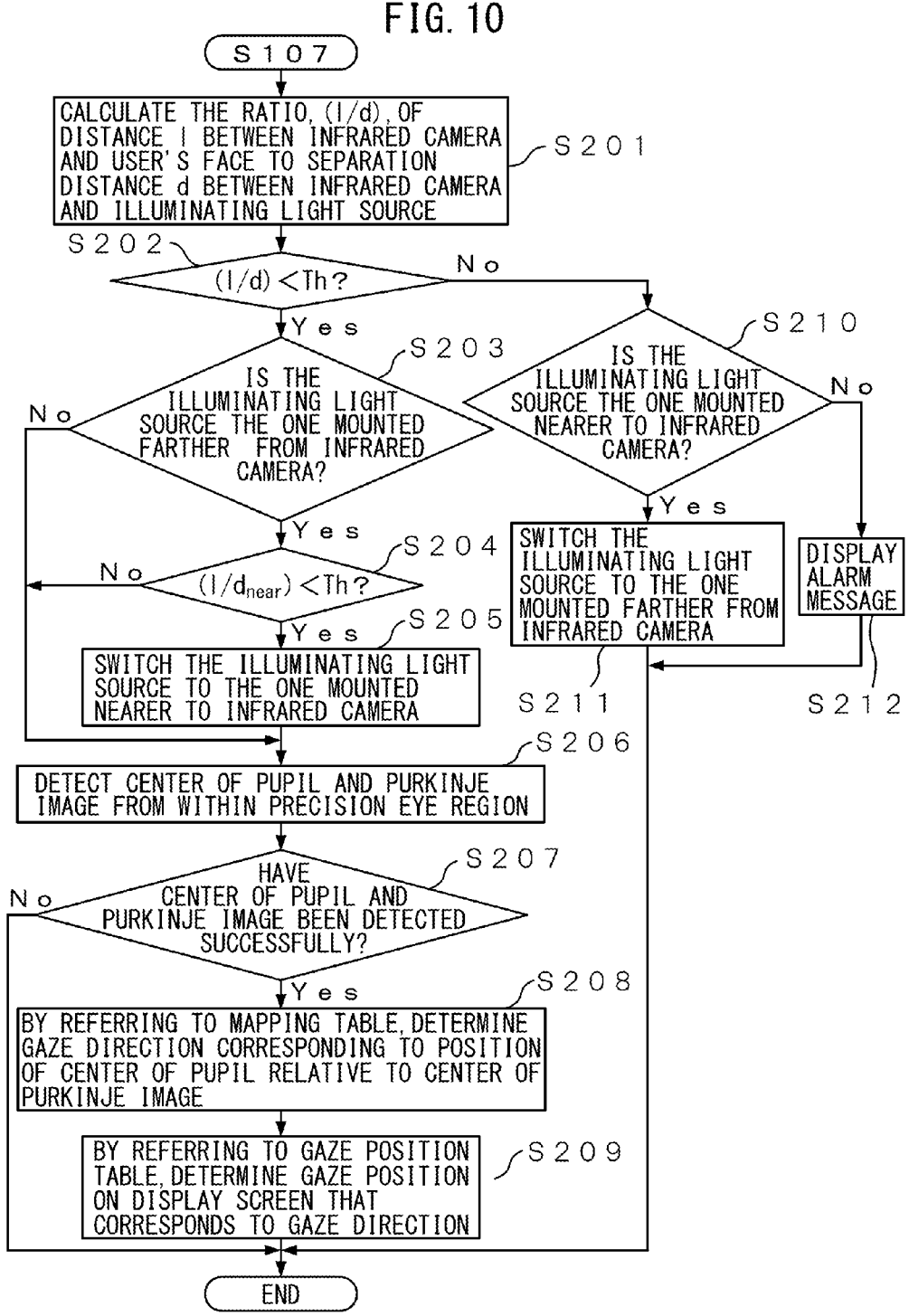
FIG. 10 is a diagram illustrating an operation flowchart of a gaze detection process according to the second embodiment.

FIG. 10 illustrates an operation flowchart of the gaze detection process carried out by the control unit 9 according to the second embodiment. The control unit 9 carries out the gaze detection process in accordance with the following operation flowchart each time the wide-angle image and narrow-angle image are generated. The gaze detection process of the second embodiment differs from the gaze detection process of the first embodiment in the process that follows the step S107 where the distance 1 between the infrared camera 5 and the user's face is estimated. The following therefore describes the process after the step S107.

When the distance 1 between the infrared camera 5 and the user's face is estimated, the judging unit 26 calculates the ratio, (l/d), of the distance 1 to the separation distance d between the infrared camera 5 and the illuminating light source turned on when acquiring the most recent narrow-angle image (step S201). Then, the judging unit 26 judges whether or not the ratio (l/d) is smaller than the threshold value Th (step S202).

If the ratio (l/d) is smaller than the threshold value Th (Yes in step S202), the judging unit 26 then judges whether or not the illuminating light source turned on when acquiring the most recent narrow-angle image is the illuminating light source 4-2, i.e., the illuminating light source mounted farther from the infrared camera 5 (step S203). If the illuminating light source is the illuminating light source 4-2 (Yes in step S203), the judging unit 26 judges whether the ratio, (l/$d_{near}$), of the distance 1 between the infrared camera 5 and the user's face to the separation distance $d_{near}$ between the illuminating light source 4-1 and the infrared camera 5 is smaller than the threshold value Th (step S204). If the ratio (l/$d_{near}$) is smaller than the threshold value Th (Yes in step S204), the bright pupil phenomenon does not occur on the narrow-angle image even if the illuminating light source 4-1 nearer to the infrared camera 5 is turned on. Therefore, the judging unit 26 switches the illuminating light source from the illuminating light source 4-2 to the illuminating light source 4-1 (step S205). As a result, the illuminating light source 4-1 is illuminating when acquiring the narrow-angle image next time, and the next cycle of the gaze detection process is performed based on the narrow-angle image acquired with the illuminating light source 4-1 turned on.

On the other hand, if the illuminating light source is the illuminating light source 4-1 (No in step S203), or if the ratio (l/$d_{near}$) is not smaller than the threshold value Th (No in step S204), the judging unit 26 does not switch the illuminating light source.

After that, the Purkinje image detection unit 27 detects the center of the pupil and the Purkinje image from within the precision eye region defined on the narrow-angle image (step S206). Then, the Purkinje image detection unit 27 determines whether the center of the pupil and the Purkinje image have been detected successfully (step S207).

If the Purkinje image detection unit 27 has successfully detected the center of the pupil and the Purkinje image of the illuminating light source 4 (Yes in step S207), the Purkinje image detection unit 27 passes information indicating the center of the Purkinje image and the center of the pupil to the gaze detection unit 28.

The gaze detection unit 28 detects, by referring to the mapping table, the gaze direction corresponding to the position of the center of the pupil relative to the center of the Purkinje image (step S208). The mapping table is constructed in advance for each illuminating light source and stored in the storage unit 8. Then, in step S208, the gaze detection unit 28 reads from the storage unit the mapping table corresponding to the illuminating light source turned on when acquiring the most recent narrow-angle image, and detects the gaze direction by referring to the mapping table.

The gaze detection unit 28 obtains, by referring to the gaze position table, the gaze position on the display screen 2a of the display unit 2 that corresponds to the gaze direction (step S209). Then, the gaze detection unit 28 passes information representing the gaze position to the application program being executed by the control unit 9.

After step S209, or if the detection of the center of the pupil or the Purkinje image has failed in step S207 (No in step S207), the control unit 9 terminates the gaze detection process.

If, in step S202, the ratio (l/d) is not smaller than the threshold value Th (No in step S202), the judging unit 26 determines that the bright pupil phenomenon can occur on the narrow-angle image. Then, the judging unit 26 judges whether or not the illuminating light source turned on when acquiring the most recent narrow-angle image is the illuminating light source 4-1, i.e., the illuminating light source mounted nearer to the infrared camera 5 (step S210). If the illuminating light source is the illuminating light source 4-1 (Yes in step S210), the judging unit 26 switches the illuminating light source to the illuminating light source 4-2 mounted farther from the infrared camera 5 (step S211). In other words, the judging unit 26 turns off the illuminating light source 4-1 and turns on the illuminating light source 4-2. As a result, the illuminating light source 4-2 is illuminating when acquiring the narrow-angle image next time, and the next cycle of the gaze detection process is performed based on the narrow-angle image acquired with the illuminating light source 4-2 turned on.

On the other hand, if the illuminating light source is the illuminating light source 4-2 (No in step S210), the bright pupil phenomenon can occur on the narrow-angle image even when the illuminating light source 4-2 is the light source illuminating the user's face. Therefore, the judging unit 26 instructs the display unit 2 to display an alarm message to notify the user that the user's face is located too far away from the display unit 2 (step S212).

After step S211 or S212, the control unit 9 terminates the gaze detection process without obtaining the user's gaze position from the most recent narrow-angle image.

As has been described above, according to the second embodiment, when the user's face is located so far away from the infrared camera that the bright pupil phenomenon could occur if the illuminating light source mounted nearer to the infrared camera were used, the gaze detection apparatus uses the illuminating light source mounted farther from the infrared camera. The gaze detection apparatus thus improves the detection accuracy of the pupil and the Purkinje image by using, wherever possible, the illuminating light source that is mounted nearer to the infrared camera and that is less likely to cause uneven illumination. Furthermore, even in a situation where the bright pupil phenomenon could occur if the illuminating light source nearer to the infrared camera were used, the gaze detection apparatus can detect the gaze position without urging the user to move his face closer to the display unit.

Next, a gaze detection apparatus according to a third embodiment will be described. The gaze detection apparatus according to the third embodiment estimates the user's gaze position in accordance with a gaze direction detection process that does not use the Purkinje image when the ratio of the estimated distance between the infrared camera and the user's face to the separation distance between the infrared camera and the illuminating light source is large enough that the bright pupil phenomenon can occur.

The gaze detection apparatus according to the third embodiment differs from the gaze detection apparatus according to the first embodiment in the processing performed by the control unit. The following description therefore deals only with the control unit. For the other units constituting the gaze detection apparatus, refer to the related description in the first embodiment.

Figure 11:
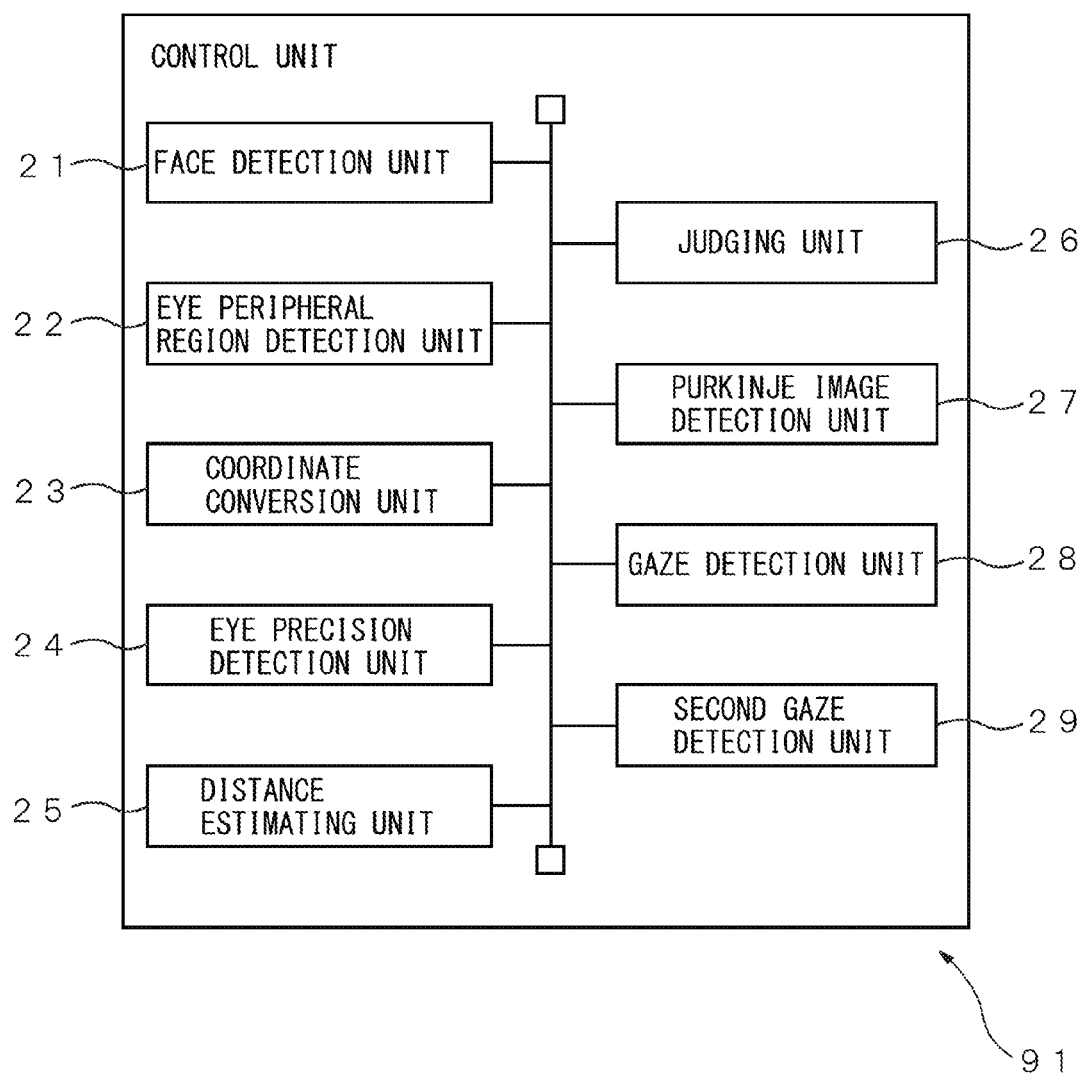
FIG. 11 is a functional block diagram of a control unit for implementing a gaze detection process in a gaze detection apparatus according to a third embodiment.

FIG. 11 is a functional block diagram of the control unit 91 for implementing the gaze detection process according to the third embodiment. The control unit 91 includes a face detection unit 21, an eye peripheral region detection unit 22, a coordinate conversion unit 23, an eye precision detection unit 24, a distance estimating unit 25, a judging unit 26, a Purkinje image detection unit 27, a gaze detection unit 28, and a second gaze detection unit 29. These units constituting the control unit 91 are functional modules implemented by executing a computer program on the processor incorporated in the control unit 91. Alternatively, these units constituting the control unit 91 may be implemented on a single integrated circuit on which the circuits corresponding to the respective units are integrated, and may be mounted in the computer 1 separately from the processor incorporated in the control unit 91. In this case, the integrated circuit may include a storage circuit which functions as a storage unit in the gaze detection apparatus separately from the storage unit 8 and stores various kinds of data used during the execution of the gaze detection process.

The control unit 91 in the gaze detection apparatus according to the third embodiment differs from the control unit 9 in the gaze detection apparatus according to the first embodiment by the inclusion of the second gaze detection unit 29. Therefore, the following describes the second gaze detection unit 29 and its associated parts.

If the ratio, (l/d), of the estimated distance l between the infrared camera 5 and the user's face to the separation distance d between the illuminating light source 4 and the infrared camera 5 is not smaller than the threshold value Th and is therefore large enough that the bright pupil phenomenon can occur on the narrow-angle image, the judging unit 26 passes the narrow-angle image to the second gaze detection unit 29.

The second gaze detection unit 29 detects the user's gaze direction without using the Purkinje image. For example, the second gaze detection unit 29 estimates the position of the center of the cornea by calculating the area ratio between the scleral portion inward of the cornea and the scleral portion outward of the cornea for one of the eyes on the narrow-angle image. Then, based on the ratio of that area ratio to the area ratio calculated when the user is looking at the reference position (for example, the center of the display screen 2a), the second gaze detection unit 29 detects the user's gaze direction by obtaining the amount of displacement from the gaze direction detected when the user is looking at the reference position.

The second gaze detection unit 29 performs template matching between the eye peripheral region or precision eye region and a template corresponding to the cornea of the eye, and determines that the region within the eye peripheral region or precision eye region that best matches the template is the corneal region containing the cornea. Then, the second gaze detection unit 29 detects a set of pixels located adjacent to and inward of the corneal region and having the brightness or color corresponding to the sclera, and determines that this set of pixels represents the scleral portion inward of the cornea. Further, the second gaze detection unit 29 detects a set of pixels located adjacent to and outward of the corneal region and having the brightness or color corresponding to the sclera, and determines that this set of pixels represents the scleral portion outward of the cornea.

Alternatively, the second gaze detection unit 29 may detect the user's gaze direction by taking the center of the corneal region itself as the center of the cornea and by obtaining, based on the displacement from the center of the cornea when the user is looking at the reference position, the amount of displacement from the gaze direction detected when the user is looking at the reference position. Further alternatively, the second gaze detection unit 29 may detect the user's gaze direction in accordance with some other gaze direction detection process that does not use the Purkinje image.

When the user's gaze direction is detected, the second gaze detection unit 29 obtains, in the same manner as the gaze detection unit 28, the user's gaze position corresponding to the user's gaze direction by referring to a gaze position table that provides a mapping between the user's gaze direction and the user's gaze position.

In the gaze detection process according to the third embodiment, the control unit 91 carries out the gaze detection and gaze position detection by using the second gaze detection unit 29, instead of displaying an alarm message, in step S109 in the operation flowchart of the gaze detection process illustrated in FIG. 8.

As has been described above, according to the third embodiment, when the user's face is located so far away from the infrared camera that the bright pupil phenomenon can occur, the gaze detection apparatus detects the gaze direction without using the Purkinje image. Therefore, even when the user's face is located so far away from the infrared camera that the bright pupil phenomenon can occur, the gaze detection apparatus can detect the user's gaze position without urging the user to move his face closer to the display unit.

In each of the above embodiments, the control unit 9 may generate a reduced image by decimating the pixels at a predetermined rate for each of the wide-angle and narrow-angle images and may perform the above processing by using the reduced images. Since this serves to reduce the amount of data used for the gaze detection process, the control unit 9 can reduce the time needed to carry out the gaze detection process.

Further, according to a modified example of each of the above embodiments, the distance estimating unit 25 may obtain the distance between the centers of the corneas of the two eyes and, based on this distance, may estimate the separation distance between the infrared camera 5 and the user's face. For example, the distance estimating unit 25 calculates the ratio of the separation distance between the centers of the corneas of the two eyes, obtained from the narrow-angle image or wide-angle image, to the separation distance between the centers of the corneas of the two eyes (hereinafter referred to as the reference separation distance) obtained when the user's face is located a predetermined reference distance (for example, 500 mm) away from the infrared camera 5. The distance estimating unit 25 then divides the reference distance by the ratio and takes the result as the estimated distance between the infrared camera 5 and the user's face. Alternatively, a distance table that maps the separation distance between the centers of the corneas to the distance between the infrared camera 5 and the user's face may be stored in advance in the storage unit 8. Then, the distance estimating unit 25 may estimate the distance between the infrared camera 5 and the user's face by referring to the distance table based on the detected separation distance between the centers of the corneas.

In this case, the distance estimating unit 25 detects the centers of the corneas of the two eyes in the same manner that the Purkinje image detection unit 27 detects the center of the cornea.

In the above case, the distance estimating unit 25 may use either the narrow-angle image or the wide-angle image in order to obtain the separation distance between the centers of the corneas of the two eyes. When the separation distance between the centers of the corneas of the two eyes is obtained based on the narrow-angle image, the wide-angle camera may be omitted.

Alternatively, the gaze detection apparatus may further include in the display unit 2 a distance sensor that detects the distance between the display unit 2 and the user's face, and the value measured by the distance sensor may be taken as representing the distance between the display unit 2 and the user's face. For example, a position sensitive detector that estimates the distance by detecting the infrared light emitted from the illuminating light source 4 and reflected by the user's face may be used as such a distance sensor.

In this modified example also, the wide-angle camera may be omitted. If the wide-angle camera is omitted, the face detection unit 21, eye peripheral region detection unit 22, and coordinate conversion unit 23 in the control unit may also be omitted. In this case, the eye precision detection unit 24 may detect the precision eye region by setting the entire narrow-angle image as the search range.

The gaze detection apparatus according to each of the above embodiments or their modified examples may be incorporated in an apparatus that operates by using the user's gaze direction, for example, a car driving assisting apparatus that determines whether to alert the user or not by detecting a change in the user's gaze direction. In this case, the gaze detection unit need only detect the user's gaze direction and may not detect the user's gaze position.

A computer program for implementing the various functions of the control unit in the gaze detection apparatus according to each of the above embodiments or their modified examples may be provided in the form recorded on a computer readable recording medium such as a magnetic recording medium or an optical recording medium. The recording medium here does not include a carrier wave.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. A gaze detection apparatus comprising:
   a first light source which illuminates a user's eye;
   a first camera which generates an image by capturing the image of a user's face; and
   a processor adapted to:
   estimate a distance between the first camera and the user's face;
   calculate the ratio of the distance between the first camera and the user's face to a separation distance between the first camera and the first light source and determine, based on the ratio, whether a bright pupil phenomenon in which an entire pupil of the user's eye appears bright due to illumination from the first light source occurs;
   detect from the captured image a corneal reflection image of the first light source and a center of the user's pupil when it is determined that the bright pupil phenomenon does not occur; and
   detect the user's gaze direction or gaze position based on a positional relationship between the center of the user's pupil and the corneal reflection image when it is determined that the bright pupil phenomenon does not occur.

2. The gaze detection apparatus according to claim 1, wherein determining whether or not the bright pupil phenomenon occurs includes comparing the ratio of the distance between the first camera and the user's face to the separation distance between the first camera and the first light source with a lower limit value thereof at and above which the bright pupil phenomenon occurs, and wherein when the ratio is not smaller than the lower limit value, it is determined that the bright pupil phenomenon occurs, on the other hand, when the ratio is smaller than the lower limit value, it is determined that the bright pupil phenomenon does not occur.

3. The gaze detection apparatus according to claim 2, wherein the separation distance between the first camera and the first light source is set so that when the ratio of the distance between the first camera and the user's face to the separation distance is equal to the lower limit value, the size of the user's pupil and the size of the corneal reflection image are both at a lower limit of recognizable size on the captured image.

4. The gaze detection apparatus according to claim 1, further comprising a second light source which is mounted in a position spaced farther away from the first camera than the first light source is, wherein
   determining whether a bright pupil phenomenon occurs includes, when it is determined that the bright pupil phenomenon occurs, turning off the first light source and turning on the second light source, and
   the first camera generates a second image by capturing the image of the user's face with the second light source turned on, and wherein
   detecting the corneal reflection image of the first light source and the center of the user's pupil includes detecting the corneal reflection image of the second light source and the center of the user's pupil from the second image, and
   detecting the user's gaze direction or gaze position includes detecting the user's gaze direction or gaze position based on the positional relationship between the corneal reflection image of the second light source and the center of the user's pupil.

5. The gaze detection apparatus according to claim 1, wherein the processor is further adapted to detect the center of the user's cornea from the captured image and detect the user's gaze direction or gaze position based on the center of the user's cornea when it is determined that the bright pupil phenomenon occurs.

6. The gaze detection apparatus according to claim 1, further comprising a second camera which is mounted in a different position than the first camera and which generates a third image by capturing the image of the user's face, and wherein
   estimating the distance includes estimating the distance between the first camera and the user's face based on the positional relationship between the position of the user's eye on the image and the position of the user's eye on the third image.

7. The gaze detection apparatus according to claim 1, wherein estimating the distance includes detecting the pupils of the user's left and right eyes, respectively, on the image and estimating the distance between the first camera and the user's face based on the separation distance between the pupils of the left and right eyes on the image.

8. A gaze detection method comprising:
- estimating a distance between a user's face and a first camera which generates an image by capturing the image of the user's face by a processor;
- calculating the ratio of the distance between the first camera and the user's face to a separation distance between the first camera and a first light source which illuminates the user's face, and determining, based on the ratio, whether a bright pupil phenomenon in which an entire pupil of the user's eye appears bright due to illumination from the first light source occurs by the processor; and
- when it is determined by the processor that the bright pupil phenomenon does not occur, detecting from the captured image a corneal reflection image of the first light source and a center of the user's pupil and detecting the user's gaze direction or gaze position based on a positional relationship between the center of the user's pupil and the corneal reflection image by the processor.

9. The gaze detection method according to claim 8, wherein when it is determined that the bright pupil phenomenon occurs, turning off the first light source and turning on a second light source, which is mounted in a position spaced farther away from the first camera than the first light source is and wherein
- detecting the corneal reflection image of the first light source and the center of the user's pupil includes detecting the corneal reflection image of the second light source and the center of the user's pupil from a second image generated by the first camera capturing the image of the user's face with the second light source turned on, and
- detecting the user's gaze direction or gaze position includes detecting the user's gaze direction or gaze position based on the positional relationship between the corneal reflection image of the second light source and the center of the user's pupil.

10. The gaze detection method according to claim 8, wherein estimating the distance includes estimating the distance between the first camera and the user's face based on the positional relationship between the position of the user's eye on the image and the position of the user's eye on a third image generated by a second camera capturing the image of the user's face, the second camera being mounted in a different position than the first camera.

11. A non-transitory computer-readable recording medium having recorded thereon a gaze detection computer program for causing a computer to implement:
- estimating a distance between a user's face and a camera which generates an image by capturing the image of the user's face;
- calculating the ratio of the distance between the camera and the user's face to a separation distance between the camera and a light source which illuminates the user's face, and determining, based on the ratio, whether a bright pupil phenomenon in which an entire pupil of the user's eye appears bright due to illumination from the light source occurs; and
- when it is determined that the bright pupil phenomenon does not occur, detecting from the captured image a corneal reflection image of the light source and a center of the user's pupil and detecting the user's gaze direction or gaze position based on a positional relationship between the center of the user's pupil and the corneal reflection image.

12. A display apparatus comprising an illuminating light source and an infrared camera, wherein the illuminating light source and the infrared camera are separated by a minimum distance determined based on a maximum expected distance between the display apparatus and a user thereof and on a prescribed coefficient,
- wherein the prescribed coefficient represents a lower limit value of the ratio of the distance between the infrared camera and the user's face to the separation distance between the illuminating light source and the infrared camera, at and above which bright pupil phenomenon can occur, and wherein the separation distance is not smaller than the maximum expected distance divided by the lower limit value of the ratio.

13. A display apparatus comprising an illuminating light source and an infrared camera, wherein the illuminating light source and the infrared camera are separated by a minimum distance determined based on a maximum expected distance between the display apparatus and a user thereof and on a prescribed coefficient,
- wherein the maximum expected distance is a distance at which a size of the user's pupil and a size of the corneal reflection image are both at a lower limit of recognizable size on an image generated by the infrared camera.

* * * * *